(12) United States Patent
Turczak et al.

(10) Patent No.: US 10,821,461 B2
(45) Date of Patent: Nov. 3, 2020

(54) METHOD FOR CONTROLLING A PUMP SYSTEM AND PUMP SYSTEM

(71) Applicant: WIWA WILHELM WAGNER GMBH & CO. KG, Lahnau (DE)

(72) Inventors: Peter Turczak, Wetzlar (DE); Dirk Scherer, Lahnau (DE)

(73) Assignee: WIWA WILHELM WAGNER GMBH & CO. KG, Lahnau (DE)

( * ) Notice: Subject to any disclaimer, the term of this patent is extended or adjusted under 35 U.S.C. 154(b) by 0 days.

(21) Appl. No.: 16/136,737

(22) Filed: Sep. 20, 2018

(65) Prior Publication Data

US 2019/0091713 A1   Mar. 28, 2019

(30) Foreign Application Priority Data

Sep. 22, 2017   (DE) .................. 10 2017 216 812

(51) Int. Cl.
| | | |
|---|---|---|
| B05B 12/14 | (2006.01) | |
| G05D 11/13 | (2006.01) | |
| B01F 15/04 | (2006.01) | |
| F04B 13/02 | (2006.01) | |
| F04B 23/02 | (2006.01) | |
| F04B 49/03 | (2006.01) | |
| F04B 49/06 | (2006.01) | |
| G05D 23/13 | (2006.01) | |

(Continued)

(52) U.S. Cl.
CPC ...... *B05B 12/1418* (2013.01); *B01F 15/0416* (2013.01); *B01F 15/0429* (2013.01); *F04B 13/02* (2013.01); *F04B 23/02* (2013.01); *F04B 49/03* (2013.01); *F04B 49/06* (2013.01); *G05D 11/132* (2013.01)

(58) Field of Classification Search
CPC ............ G05D 23/1393; G05D 23/139; G05D 311/132; B01F 15/0429; B01F 15/0416; F01L 13/0005; F01L 1/267; B05B 12/1418; F04B 23/02; F04B 13/02; F04B 49/03; F04B 49/06
USPC ................................................. 700/265, 282
See application file for complete search history.

(56) References Cited

U.S. PATENT DOCUMENTS

2009/0280034 A1* 11/2009 Ballu ................... G05D 11/133
422/105
2017/0152849 A1*  6/2017 Turczak ................ F04B 17/03

FOREIGN PATENT DOCUMENTS

| DE | 19543548 A1 | 5/1997 |
|---|---|---|
| DE | 102004038017 A1 | 3/2006 |

(Continued)

*Primary Examiner* — Michael J Brown
(74) *Attorney, Agent, or Firm* — King & Schickli, PLLC

(57) ABSTRACT

A method for controlling a pump system as well as to a pump system with multi-component material being dispensed under pressure using a mixer and a spray gun of the pump system, component material being pumped using at least two pumps of the pump system, said component material being stored using liquid tanks of the pump system each allocated to the pumps, said component material being dosed using dosage valves of the pump system each allocated to the pumps, said pump system being controlled by means of a control unit of the pump system, said dosage valves each being regulated using an electric regulating device of the control unit each allocated to the pump, a mixing ratio of the component materials being regulated using a control device of the control unit, said regulating devices being regulated by means of the control device.

21 Claims, 2 Drawing Sheets

(51) Int. Cl.
*F01L 13/00* (2006.01)
*F01L 1/26* (2006.01)

(56) References Cited

FOREIGN PATENT DOCUMENTS

DE 102012010544 A1 12/2013
WO WO2016019948 A2 2/2016

* cited by examiner

METHOD FOR CONTROLLING A PUMP SYSTEM AND PUMP SYSTEM

This application incorporates by reference the disclosure of German Patent Application no. 10 2017 216 812.9, filed Sep. 22, 2017.

TECHNICAL FIELD

The invention relates to a method for controlling a pump system as well as to a pump system, multi-component material being dispensed under pressure using a mixer and a spray gun of the pump system, component material being pumped using at least two pump of the pump system, said component material being stored using liquid tanks of the pump system each allocated to the pumps, said component material being dosed using the respective dosage valve of the pump system each allocated to the pumps, said pump system being controlled by means of a control unit of the pump system.

BACKGROUND

Pump systems and methods of this kind for controlling and operating pump systems are well known from the state of the art and are regularly used for surface coating, i.e. for applying or spraying a multi-component material onto a surface. The multi-component material consists of at least two component materials, for example a basic component material and a feed component material or a hardener component material, each of these component materials being stored separately in liquid tanks. Each liquid tank is allocated to a pump for pumping the respective component material. Pneumatically driven piston pumps are used in this context, for example; however, other types of pumps may be used as well. By means of the respective pumps, the component materials are pumped to a so-called mixer and are mixed within the mixer in such a manner that the thus formed multi-component material can harden. From the mixer, the multi-component material is pumped under pressure to a so-called spray gun by means of the pump. The spray gun does not necessarily have to be in the shape of a gun, but can be any type of nozzle by means of which the multi-component material can be sprayed onto a surface by atomization. This can take place preferably by using pressurized air. Optionally, one or more heaters can be provided for adjusting the temperature of the component material.

Furthermore, the pump systems always comprise a control unit which can be realized like an operating device so that a user can use and control the pump system. Via the operating device or rather via the control unit, a mixing ratio of the component materials can be set by a user, for example. Such a setting is regularly carried out via a variation of the respective pumping amount of the pumps. The control unit can thus also comprise different sensors, flow-through-amount meters, volume meters or similar means for determining and influencing a pumping amount of the pumps. In particular, a dosage valve is allocated to each pump, a flow-through amount or a volume flow of the respective component material being able to be adapted via said pump such that the desired mixing ratio is attained. A basic component material, for example, can be pumped using a pump, the respective dosage valve being entirely opened. A feed component material, such as a hardener, can then be pumped using a further pump, the respective dosage valve being opened and closed in a clocked manner, for example. The basic component is then discontinuously supplied with the feed component and mixed in the mixer to form the multi-component material. The dosage valves are opened or clocked by means of the control unit according to the desired mixing ratio. A regulation can also be intended which adapts actual volume flows of component material measured by the control unit to target volume flows according to the setting of the respective mixing ratio. Such a pump system is known from DE 10 2012 010 544 A1, for example.

Pump systems can be realized so as to be transportable or even be installed stationary and comprise more than two pumps and liquid tanks. The pump systems can be used in a painting plant, for example, it then even being possible to simultaneously use a plurality of component materials, such as different colors. If a color is to be switched out, the respective pumping lines or the mixer can also be cleaned by means of the control unit in the scope of a cleaning function.

The known pump systems are always configured such that a basic component is pumped using a pump and a feed component is pumped using one or more further pumps. A volume flow of the feed component can also be regulated according to a volume flow of the basic component in order to attain the desired mixing ratio. The respective pumps and pumping lines are thus each realized differently for pumping the respective component material. The control unit in particular is adapted to different component materials having to be pumped, for example having a measurement of a flow-through amount or a volume flow of a feed component. The control unit is thus always realized for the type of component material to be pumped using the pumps. If, for example, a pump system is to be expanded by another color or a component material using a further pump, a further liquid tank and a further dosage valve, the control unit would have to be adapted to the extent possible and exchanged for a new control unit.

The known control units generally comprise electric or electronic components having devices for processing data, display elements and operating elements, for example. For protection against explosion, such components as well as switches and electric actuating elements have to be realized as pressure-tight encapsulated units in the area of spray technology according to the ATEX Guidelines for protection against explosion according to production guidelines 2014/34/EU and operational policies 1999/92/EC so that a safe operation of the pump system is possible in an explosive atmosphere. The control unit is therefore received in a backfilled, cast or encapsulated and tightly sealed casing, the dosage valves at the pump lines being actuated pneumatically, via a pressurized-air line from the control unit to the respective pneumatic valve, for example. Within the casing of the control unit, the electric components are cabled with each other. An electric control device of the control unit can, for example, be cabled with electrically actuatable control valves for pressurized air for actuating the dosage valves. In particular, the control unit can be a PLC controller.

According to the ATEX Guidelines, manufacturers of pump systems must fulfill basic health and safety requirements and must certify this via corresponding conformity assessment procedures, which in particular pertains to the design of the control unit. If an already existing pump system is to be expanded by another color or pump, the control unit has to be expanded by electric components for actuating a further dosage valve. In some instances, a casing of the control unit or a control cabinet is no longer sufficiently large for such an expansion, which makes producing an entirely new control unit necessary. A required conformity assessment procedure then has to be carried out again so as to verify the fulfillment of the ATEX Guidelines.

Therefore, an individual adaptation of a control unit to different pump systems is connected to a high expenditure when producing a pump system. An expansion of a pump system by further pumps is not always economically feasible, in particular when the control unit has to be exchanged in its entirety.

The objective of the present invention is therefore to propose a method for controlling a pump system as well as proposing a pump system which enables a versatile usage of the pump system while simultaneously keeping production costs low.

This objective is attained by a method having the features of claim 1 and a pump system having the features of claim 11.

In the method according to the invention for controlling a pump system, multi-component material is dispensed under pressure using a mixer and a spray gun of the pump system, component material being pumped using at least two pumps of the pump system, said component material being stored using liquid tanks of the pump systems having allocated pumps, said component material being dosed using the dosage valves of the pump system having allocated pumps, said pump system being controlled by means of a control unit of the pump system, said dosage valves each being regulated using an electric regulating device of the control unit, a mixing ratio of the component materials being regulated using a control device of the control unit, said regulating devices being regulated by means of the control device.

According to this, the control unit or rather the operating device comprises an electric regulating device for each pump. The term pump is understood to be any kind of pumping system which is generally suitable for pumping component material, such as pressure vessels, diaphragm pumps or piston pumps. The regulating devices are configured for regulating the respective dosage valve and thus for regulating a volume flow of component material by setting or actuating the dosage valve. The control unit further comprises the control device which in turn regulates the regulating devices. The control device can set or regulate a desired mixing ratio of the component material, for example, by transferring an amount of component material, e.g. a volume flow, to the respective regulating devices, which in turn make the respective volume flow available by actuating the dosage valves. In contrast to the methods having a control unit and known from the state of the art, the control unit in this instance is made of a control device having at least regulating devices, each dosage valve and each pump being allocated to a regulating device. An allocation is understood to be the arrangement of the dosage valve in a dosage line of the respective pump as well as the setting of the dosage valve using the respective regulating device. By the control unit being realized in several parts and in particular by each pump having a dosage valve having a regulating device, it becomes generally possible to operate the pumps independently of each other. A particular adaptation of the control unit to a basic component or a feed component is no longer required then since each of the pumps can be optionally used with the basic component or the feed component. Furthermore, it is possible to use a universal control device and/or regulating device for different pump systems, whereby an expansion of a pump system is made easier. The regulating device and/or the control device can thus be assessed solely regarding its conformity based on the ATEX Guidelines so that a control unit already conforming to the ATEX Guidelines is yielded from a combination of the control device with the regulating devices. The costs for the production and expansion of pump systems can be considerably lowered by individually regulating the dosage valves, which enable using respective electric regulating devices.

Thus, the control device can regulate the regulating devices as a guiding regulator of a cascade regulation. The control device, which can comprise a device for processing data as well as operating and display elements, can be realized such that at least basic functions of the pump system can be executed by a user by means of the control device. A mixing ratio of component material can in particular be set for the control device by the user or via an external communication connection. Furthermore, mixing ratios of component materials can already be saved in the control device. The control device can regulate the dispensation of multi-component material according to a target mixing ratio. This can happen by, for example, a guiding quantity, such as a volume flow of a component material, being measured and an actual mixing ratio being adapted accordingly. The control device does not directly control the dosage valves but can transmit a signal to the respective electric regulating devices, which in turn adapt the volume flow(s) of component material via the respective dosage valves. Therefore, the regulating devices can each also comprise means for processing data. In one embodiment, a computer program product can be carried out by the control device and a further computer program product can be carried out by the regulating devices, the respective computer program products then being able to communicate with each other. The computer program product of the control device can thus convey a target volume flow as a function of a preset mixing ratio to the further computer program product of the regulating device, for example. A computer program product is understood to be an application of software technology or a software.

By means of a data bus of the control unit, data can be exchanged between the control device and the regulating devices. The data bus can comprise a fieldbus or any type of a connection network such as RS-485 or standards for data transfer such as Bluetooth, ZigBee, WiFi, GMS, UMTS and LTN. By exchanging data between the control device and the regulating devices via the data bus, it becomes possible to make producing the pump system significantly easier, since a complicated cabling of the control unit or in a control cabinet is no longer required. Every electric component of the pump system can be connected to the control device via the data bus. It is thus possible to exchange data between the control device and the pumps by means of the data bus. If the pumps are piston pumps, they can comprise a path measuring sensor, via which a dispensation amount of component material can be detected by the control device by means of a position of a piston of the pump. This path measuring sensor can also be connected to the control device via the data bus.

An actual volume flow of at least one of the component materials at a dosage valve can be detected and measured by means of a sensor and be transmitted to the control device and/or regulating device. The sensor can be a flow-through-amount sensor, such as a gear measuring cell, in a pump line of a pump or also a path measuring sensor at a pump, such as path measuring system or a rotation counter, or any other suitable means for measuring the flow-through amount. Using the sensor, the actually available volume flow, which passes through the respective dosage valve, and thus a dispensation amount of the respective component material in a period of time can be determined. This actual volume flow can be used by the control device for regulating the regulating devices and/or by the respective regulating device for regulating the allocated dosage valve.

Consequently, the control device can regulate the actual volume flow of the component material via the regulating device of the dosage valve.

The control device can set a target volume flow for the regulating device, for example, said regulating device adapting the setting of the dosage valve such that the actual volume flow corresponds to or is approximated to the target volume flow.

The regulating device can regulate the actual volume flow according to a target volume flow by means of a discontinuous or continuous opening of the dosage valve. The dosage valve can be a proportional valve, a proportional valve having a check valve or a different suitable valve, said regulating device being able to control the volume flow via a continuous setting and adapting of a valve opening. Alternatively thereto, the regulating device can discontinuously regulate the dosage valve, i.e. by repeatedly opening and closing the dosage valve, such that a volume of component material is dispensed in a clocked manner by the dosage valve over a period of time. It thus becomes possible to discontinuously open one of the dosage valves and continuously open the other dosage valve. A continuous opening can then be of advantage if a comparatively viscous component material is being pumped or if the component material is to be mixed particularly well. The pump system can thus also be adapted to a viscosity of component materials. It is of advantage if an actual volume flow of component materials of the respective pump can be measured, said control device being able to capture the respective actual volume flows and being able to set a target volume flow corresponding to the mixing ratio for the respective regulating devices. The actual volume flow can be measured by means of a sensor at a pump line of the respective pump and/or by means of a path measuring sensor at a pump, for example. Generally, it suffices if only one actual volume flow of a component material is measured so that the target volume flows corresponding to the mixing ratios can be transferred to the regulating devices of the remaining component materials by the control device. A more precise setting of a mixing ratio can already be attained by all actual volume flows of component materials being measured and transferred to the control device. Generally, it is of no importance which of the component materials is a basic component material or a feed component material.

The component materials can be a basic component A and a feed component B, a target volume flow of the feed component being able to be regulated by the control device according to an actual volume flow of the basic component or a target volume flow of the basic component being able to be regulated by the control device according to an actual volume flow of the feed component. A guiding component material crucial for regulation can thus be the basic component or the feed component.

Alternatively thereto, the component materials can be a basic component and a feed component, a target volume flow of the feed component being able to be regulated by the control device independently of an actual volume flow of the basic component and a target volume flow of the basic component being able to be regulated by the control device independently of an actual volume flow of the feed component. According thereto, none of the component materials is a component material guiding for regulation but the respective actual volume flows of the component materials are regulated entirely independently of each other according to their respective target volume flows.

The pump system according to the invention for dispensing multi-component material under pressure using a spray gun comprises a spray gun, a mixer and at least two pumps for pumping component materials and respectively allocated dosage valves for dosing liquid tanks for storing component materials, said pump system comprising a control unit, said pump system being able to be controlled by means of the control unit, each of the pumps being allocated to an electric regulating device of the control unit for regulating the dosage valve, said control unit comprising a control device for regulating a mixing ratio of the component materials, said regulating devices being able to be regulated by means of the control device. The description of advantages of the method according to the invention is referred to for the advantageous effects of the pump system according to the invention.

The pump system can be realized particularly easily if the control unit has a data bus which connects the control device to the regulating devices. The data bus can be a wired bus or a wireless bus in the form a connection network. A data bus is understood to be a connection network which uses a protocol for transferring data. By the control unit comprising a data bus, a sophisticated wiring of electric components of the control unit to each other can be omitted. In particular, a plurality of cables and thus construction space can be reduced. The control can also be expanded more easily by further electric components being able to be easily connected to the data bus.

The pump can be a piston pump, said pump being able to comprise a path measuring sensor for measuring an actual volume flow or a volume flow of the component material, which is pumped by the pump, by means of the control device. The path measuring sensor can detect a position of a piston of the piston pump and its path within a period of time so that an amount of the component material pumped by the piston pump can be measured in the period of time. The piston pump can be a pneumatically, hydraulically or electrically driven pump. Alternatively thereto, the pump can be a rotary pump having a corresponding drive, said pump not necessarily having to comprise a path measuring sensor.

The regulating device can comprise a flow-through-amount sensor for measuring a volume flow of the component material, which is pumped using the pump, by means of the control device. By means of the flow-through-amount sensor, it becomes possible to measure an actual volume flow of the component material passing through the dosage valve, independently of the type of pump pumping the component material. Nevertheless, a path measuring sensor for measuring an actual volume flow can be provided on the pump in supplementation to the flow-through-amount sensor. If the regulating device comprises the flow-through-amount sensor, the regulating device can directly regulate the actual volume flow according to a target volume flow, which can be set by the control device, by actuating the allocated dosage valve.

The control device and the regulating devices can each be disposed in their own casing, said regulating devices being able to be spatially distanced from the control device. This means the control device can be disposed in its own casing and each of the regulating devices can also be disposed in their own casing. This makes it possible to position the regulating devices spatially independently of each other and spatially independently of the control device or to install them on the pump system. This allows realizing the pump more versatile in general.

Preferably, the control device and the regulating devices can be realized so as to be explosion-proof. This can be attained, for example, by disposing the control device and the regulating devices in enclosed casings. These casings can then each be realized as a pressure-tight encapsulated unit in conjunction with the regulating devices or the control device according to the ATEX Guidelines for protection against explosion according to the production guidelines 2014/34/EU and the operating guidelines 1999/92/EC in the version valid before the priority date of this application. Thus a particularly safe operation of the pump system can be ensured. As long as the control device and the regulating devices are realized independently of each other in a manner conform to the ATEX Guidelines, it is no longer required to verify conformity with the ATEX Guidelines for the control unit. When expanding the pump system by another color or another component material and an allocated pump, a regulating device can be added to the pump system, the ATEX conformity already having been established for said regulating device. As long as the already installed control device and regulating devices also conform to the ATEX Guidelines, establishing the conformity again for said devices is no longer required. This allows an individual setup of a pump system or an expansion of a pump system without having to conduct a cost-intensive establishment of ATEX conformity of the entire system of the control unit.

The pump system can be produced even more inexpensively if the regulating devices are designed in the same manner. This can be carried out, for example, by the regulating devices comprising a device for processing data which enables an individual adaptation of the regulating device via a computer program product executed using the device for processing data. In conjunction with a data bus, it is possible to connect and adapt any number of regulating devices to the control device.

The regulating device can also be disposed directly on the dosage valve. The dosage valve can then be directly regulated by the regulating device. It is then no longer required to use an air hose, for example, of a control unit for controlling the dosage valve; this also causes the disadvantage of a pressure impulse causing a delayed reaction of the dosage valve via the air hose. Directly disposing the regulating device on the dosage valve, in contrast, enables directly triggering an impulse at the dosage valve. Directly disposing the regulating device on the dosage valve is of particular advantage if the regulating device is realized so as to be explosion-proof.

The dosage valves can form a valve arrangement in conjunction with the regulating devices, which can be disposed directly adjacent. In particular if the regulating devices are realized in the same manner, the regulating devices or rather their casings can be connected to each other via corresponding connecting devices. The connecting devices can comprise electric and/or pneumatic plugs or couplings. A pressurized-air line can, for example, be guided through a stack arrangement of regulating devices such that the regulating devices can be supplied with auxiliary air for actuating the dosage valves and only a pressurized-air line is required. A simple connection of the regulating devices to a data bus is also enabled. The thus realized valve arrangement can generally be disposed on the pump system spatially independently of the control device. The pump system can be expanded by another color or pumps for component material by only a regulating device having a dosage valve, which is allocated to the further pump, being added in addition to a further pump of the valve arrangement, without the existing regulating devices and the control device having to be exchanged or changed.

Consequently, the valve arrangement having dosage valves can be realized so as to be modularly expandable. It is then possible to always use a type of control device and of regulating device for producing various pump systems, said pump system to be produced being adapted by a number of regulating devices being able to be chosen. Further, it is possible to adapt a software or a computer program product of the control device and the regulating devices according to the desired control method of the pump system without great expenditure.

Further advantageous embodiments of the pump system can be derived from the descriptions of features of the dependent claims referring to method claim 1.

BRIEF DESCRIPTION OF THE DRAWINGS

In the following, preferred embodiments of the invention are further described with reference to the attached drawings.

In the following.

SUMMARY

Figure 1:
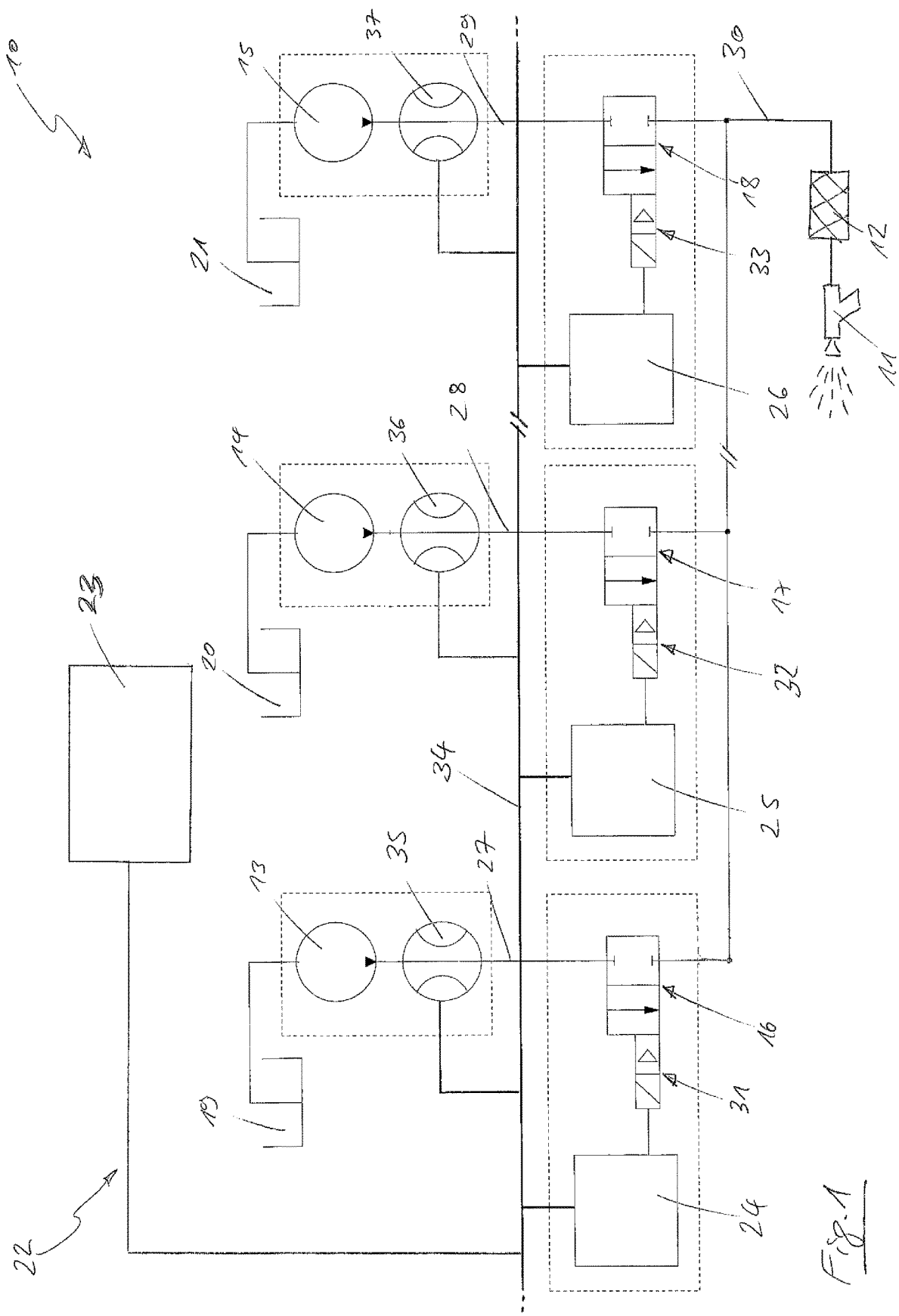
FIG. 1 illustrates a schematic view of an embodiment of a pump system.

FIG. 1 illustrates a schematic view of a pump system 10 which comprises a spray pistol 11, a mixer 12 and pumps 13, 14, 15 for pumping component material and comprises dosage valves 16, 17, 18 allocated respectively for dosing the component material as well as liquid tanks 19, 20 and 21 for storing the component material. The pump system 10 further comprises a control unit 22 made of a control device 23 and regulating devices 24, 25 and 26. The dosage valves 16, 17 and 18 are each allocated to the pumps 13, 14 and 15, respectively, and connected thereto via pump lines 27, 28 and 29. The pumped component materials are collected downstream of the dosage valves 16, 17 and 18 in a pump line 30 and are supplied to the mixer 12 and the spray pistol 11. In the mixer 12, the component materials are mixed to form the multi-component material. The electric regulating devices 24, 25 and 26 are also allocated to the pumps 13, 14 and 15, respectively, and thus to the dosage valves 16, 17 and 18, respectively. The regulating devices 24, 25 and 26 control an actuation device 31, 32 and 33, respectively, of the respective dosage valve 16, 17 and 18 for opening, closing or setting the respective dosage valve 16, 17 and 18 such that they are regulated. Furthermore, the regulating devices 24, 25 and 26 are regulated by the control device 23 as a guiding regulator in the make of a cascade regulation.

The control unit 32 comprises a data bus 34, to which the control device 23, the regulating devices 24, 25 and 26 and sensors 35, 36 and 37 are connected in this instance for measuring a volume flow. The sensors 35, 36 and 37 can be flow-through-amount sensors or even path measuring sensors on the pumps 13, 14 and 15, respectively.

Using the sensors 35, 36 and 37, an actual volume flow of component material of the respective pump 13, 14 and 15 is measured and transferred to the control device 23 via the data bus 34. The control device 23 indicates respective target volume flows for the component material to the regulating devices 24, 25 and 25 via the data bus 34 according to the desired mixing ratio of the component material. The regulating devices 24, 25 and 26 in turn regulate the dosage valve 16, 17 and 18, respectively, via the respective actuating devices 31, 32 and 33, respectively, in such a manner that the respective actual volume flow is approximated to the target volume flow. Completely independently of each other, the dosage valves 16, 17 and 18 can be regulated discontinuously or continuously or in a set or clocked manner. The control device 23 and at least the respective regulating devices 24, 25 and 26 are each disposed in their own casing (not illustrated) which is realized so as to be explosion-proof.

Figure 2:
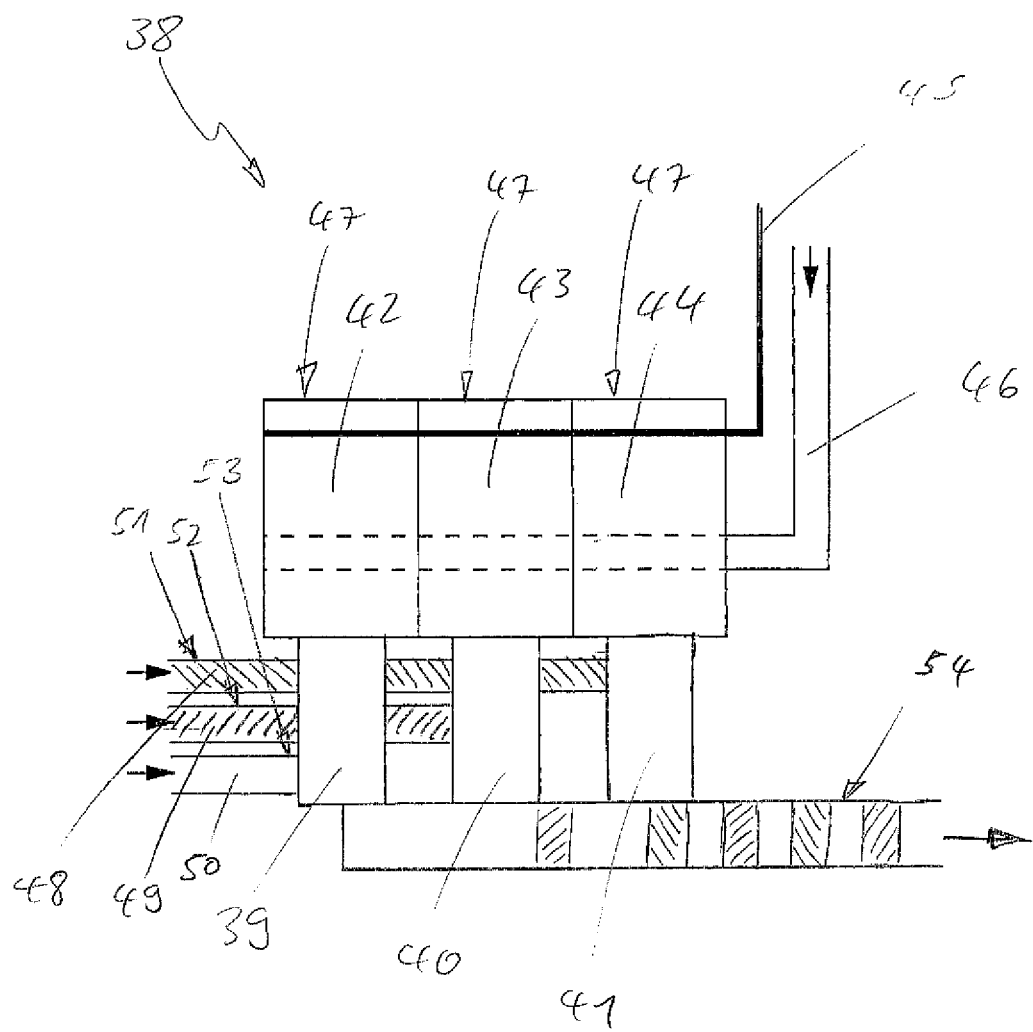
FIG. 2 illustrates a schematic view of a valve arrangement.

FIG. 2 illustrates a valve arrangement 38 of a pump system (not further illustrated in this instance), said valve arrangement 38 comprising dosage valves 39, 40 and 41 having respectively allocated regulating devices 42, 43 and 44. The regulating devices 42, 43 and 44 are directly disposed on the dosage valves 39, 40 and 41, respectively, are realized in the same manner, and are connected to each other. Furthermore, the regulating devices 42, 43 and 44 are connected to a data bus 45 which connects the regulating devices 42, 43 and 44 to a control device not illustrated in this instance and disposed at a distance. The regulating devices 42, 43 and 44 are also connected to a pressurized-air line 46 for actuating the dosage valves 39, 40 and 41 and each comprise their own encapsulated, explosion-proof casing 47. Different component materials 48, 49 and 50 are supplied to the respective dosage valves 39, 40 and 41 in the respective pump lines 51, 52 and 53 and are dosed in a pump line 54 switched upstream to a mixer (not illustrated in this instance).

The invention claimed is:

1. A method for controlling a pump system (10), multi-component material being dispensed under pressure using a mixer (12) and a spray gun (11) of the pump system, component material (48, 49, 50) being pumped using at least two pumps (13, 14, 15) of the pump system, said component material being stored using a liquid tank (19, 20, 21) of the pump system allocated to the pumps, said component material being dosed using dosage valves (16, 17, 18, 39, 40, 41) of the pump system allocated to the pumps, said pump system being controlled by means of a control unit (22) of the pump system, characterized in that the dosage valves are each regulated using an electric regulating device (24, 25, 26, 42, 43, 44) of the control unit, a mixing ratio of the component materials being regulated using a control device (23) of the control unit, said regulating devices being regulated by means of the control device;

wherein an actual volume flow of component material (48, 49, 50) of the respective pump (13, 14, 15) is measured, the control device (23) capturing the respective actual volume flows and specifying a target volume flow for the respective regulating device (24, 25, 26, 42, 43, 44) according to the mixing ratio.

2. The method according to claim 1, characterized in that the control device regulates the regulating device as a guiding regulator of a cascade regulation.

3. The method according to claim 1, characterized in that data can be exchanged between the control device (23) and the regulating devices (24, 25, 26, 42, 43, 44) by means of a data bus.

4. The method according to claim 3, characterized in that data is exchanged between the control device (23) and the pumps (13, 14, 15) by means of the data bus (34, 35).

5. The method according to claim 1, characterized in that an actual volume flow of at least one of the component materials (48, 49, 50) is detected at a dosage valve (16, 17, 18, 39, 40, 41) by means of a sensor (35, 36, 37) and is transferred to the control device (23) and/or the regulating device (24, 25, 26, 42, 43, 44).

6. The method according to claim 5, characterized in that the control device (23) regulates the actual volume flow of the component material (48, 49, 50) via the regulating device (24, 25, 26, 42, 43, 44) of the dosage valve (16, 17, 18, 39, 40, 41).

7. The method according to claim 5, characterized in that the regulating device (24, 25, 26, 42, 43, 44) regulates the actual volume flow according to a target volume flow by means of a discontinuous or continuous opening of the dosage valve (16, 17, 18, 39, 40, 41).

8. The method according to claim 1, characterized in that the component materials (49, 49, 50) are a basic component (A) and a feed component (B), a target volume flow of the feed component being regulated by the control device (23) according to an actual volume flow of the basic component or a target volume flow of the basic component being regulated by the control device (23) according to an actual volume flow of the feed component.

9. The method according to claim 1, characterized in that the component materials (49, 49, 50) are a basic component (A) and a feed component (B), a target volume flow of the feed component being regulated by the control device (23) independently of an actual volume flow of the basic component and a target volume flow of the basic component being regulated by the control device (23) independently of an actual volume flow of the feed component.

10. A pump system (10) for dispensing multi-component material under pressure using a spray gun (11), said pump system comprising a spray gun (11), a mixer (12) and at least two pumps (13, 14, 15) for pumping component material (48, 49, 50) as well as accordingly allocated dosage valves (16, 17, 18, 39, 40, 41) for dosing and a liquid tank (19, 20, 21) for storing component material, said pump system comprising a control unit (22), said pump being able to be controlled by means of the control unit, characterized in that each of the pumps has an electric regulating device (24, 25, 26, 42, 43, 44) of the control unit allocated to it for regulating the dosage valve, said control unit comprising a control device (23) for regulating a mixing ratio of the component materials, said regulating devices being able to be regulated by means of the control device;

wherein an actual volume flow of component material (48, 49, 50) of the respective pump (13, 14, 15) is measured, the control device (23) capturing the respective actual volume flows and specifying a target volume flow for the respective regulating device (24, 25, 26, 42, 43, 44) according to the mixing ratio.

11. The pump system according to claim 10, characterized in that the control unit comprises a data bus (34, 35) which connects the control device (23) to the regulating devices (24, 25, 26, 42, 43, 44).

12. The pump system according to claim 10, characterized in that the pump (13, 14, 15) is a piston pump, said pump comprising a path measuring sensor for measuring an actual volume flow of the component material (48, 49, 50), which is pumped using the pump, by means of the control device (23).

13. The pump system according to claim 10, characterized in that the regulating device (24, 25, 26, 42, 43, 44) comprises a flow-through-amount sensor for measuring a volume flow of the component material (48, 49, 50), which is pumped using the pump (13, 14, 15), by means of the control device (23).

14. The pump system according to claim 10, characterized in that the control device (23) and the regulating devices (24, 25, 26, 42, 43, 44) are each disposed in their own casing (47), said regulating devices being positioned spatially distanced from the control device.

15. The pump system according to claim 10, characterized in that the control device (23) and the regulating devices (24, 25, 26, 42, 43, 44) are realized so as to be explosion-proof.

16. The pump system according to claim 10, characterized in that the regulating devices (24, 25, 26, 42, 43, 44) are realized in the same manner.

17. The pump system according to claim 10, characterized in that the regulating device (24, 25, 26, 42, 43, 44) are disposed directly on the dosage valve (16, 17, 18, 39, 40, 41).

18. The pump system according to claim 10, characterized in that the dosage valves (16, 17, 18, 39, 40, 41) form a valve arrangement (38) in conjunction with the regulating devices (24, 25, 26, 42, 43, 44), said regulating devices being disposed directly adjacent.

19. The pump system according to claim 18, characterized in that the valve arrangement (38) having dosage valves (16, 17, 18, 39, 40, 41) is realized so as to be modularly expandable.

20. A method for controlling a pump system (10), multi-component material being dispensed under pressure using a mixer (12) and a spray gun (11) of the pump system, component material (48, 49, 50) being pumped using at least two pumps (13, 14, 15) of the pump system, said component material being stored using a liquid tank (19, 20, 21) of the pump system allocated to the pumps, said component material being dosed using dosage valves (16, 17, 18, 39, 40, 41) of the pump system allocated to the pumps, said pump system being controlled by means of a control unit (22) of the pump system, characterized in that the dosage valves are each regulated using an electric regulating device (24, 25, 26, 42, 43, 44) of the control unit, a mixing ratio of the component materials being regulated using a control device (23) of the control unit, said regulating devices being regulated by means of the control device;

wherein an actual volume flow of component material (48, 49, 50) of the respective pump (13, 14, 15) is measured, the control device (23) capturing the respective actual volume flows and specifying a target volume flow for the respective regulating device (24, 25, 26, 42, 43, 44) according to the mixing ratio and the regulating device (24, 25, 26, 42, 43, 44) are disposed directly on the dosage valve (16, 17, 18, 39, 40, 41).

21. A pump system (10) for dispensing multi-component material under pressure using a spray gun (11), said pump system comprising a spray gun (11), a mixer (12) and at least two pumps (13, 14, 15) for pumping component material (48, 49, 50) as well as accordingly allocated dosage valves (16, 17, 18, 39, 40, 41) for dosing and a liquid tank (19, 20, 21) for storing component material, said pump system comprising a control unit (22), said pump being able to be controlled by means of the control unit, characterized in that each of the pumps has an electric regulating device (24, 25, 26, 42, 43, 44) of the control unit allocated to it for regulating the dosage valve, said control unit comprising a control device (23) for regulating a mixing ratio of the component materials, said regulating devices being able to be regulated by means of the control device;

wherein an actual volume flow of component material (48, 49, 50) of the respective pump (13, 14, 15) is measured, the control device (23) capturing the respective actual volume flows and specifying a target volume flow for the respective regulating device (24, 25, 26, 42, 43, 44) according to the mixing ratio and the regulating device (24, 25, 26, 42, 43, 44) are disposed directly on the dosage valve (16, 17, 18, 39, 40, 41).

* * * * *